(12) United States Patent
Smith et al.

(10) Patent No.: US 8,079,798 B2
(45) Date of Patent: Dec. 20, 2011

(54) TILTABLE LOADING RAMP

(76) Inventors: Robert Clifford Smith, Dudley (GB); John David Owen, Oldbury (GB)

( * ) Notice: Subject to any disclaimer, the term of this patent is extended or adjusted under 35 U.S.C. 154(b) by 116 days.

(21) Appl. No.: 12/428,922

(22) Filed: Apr. 23, 2009

(65) Prior Publication Data

US 2009/0269176 A1 Oct. 29, 2009

(30) Foreign Application Priority Data

Apr. 24, 2008 (GB) .................................. 0807454.4

(51) Int. Cl.
*B60P 1/24* (2006.01)
(52) U.S. Cl. ............ 414/537; 414/469; 14/71.1; 296/61
(58) Field of Classification Search .................. 414/462, 414/469, 480, 537; 298/17 SG; 14/69.5, 14/71.1; 296/61
See application file for complete search history.

(56) References Cited

U.S. PATENT DOCUMENTS

| 3,550,801 | A | * | 12/1970 | Larson et al. ................. 414/480 |
| 3,708,081 | A | * | 1/1973 | Schladenhauffen .......... 414/462 |
| 3,720,333 | A | * | 3/1973 | Vaughn ......................... 414/462 |
| 3,720,336 | A | | 3/1973 | Murray et al. |
| 3,726,423 | A | * | 4/1973 | Miron ............................ 414/480 |
| 4,470,746 | A | | 9/1984 | Delachapelle |
| 5,697,754 | A | * | 12/1997 | Raymer ......................... 414/537 |
| 6,431,815 | B1 | * | 8/2002 | Zarzecki et al. .............. 414/537 |
| 6,634,848 | B2 | * | 10/2003 | Henderson .................... 414/537 |
| 6,722,721 | B2 | * | 4/2004 | Sherrer et al. ................. 296/61 |
| 6,733,219 | B1 | * | 5/2004 | Floe ................................. 410/3 |
| 2004/0051290 | A1 | | 3/2004 | Morgan |

FOREIGN PATENT DOCUMENTS

| GB | 1329068 | 9/1973 |
| WO | 94/15811 A1 | 7/1994 |

* cited by examiner

*Primary Examiner* — Saul Rodriguez
*Assistant Examiner* — Jonathan Snelting
(74) *Attorney, Agent, or Firm* — Fleit Gibbons Gutman Bongini & Bianco, PL; Paul D. Bianco; Martin Fleit

(57) ABSTRACT

A tiltable loading ramp for loading and unloading a first vehicle onto and from a second vehicle, comprises at least two ramp sections which are abuttable or substantially abuttable to form a ramp surface, and at least one support member forming a fulcrum for the ramp surface. The in use at least one support member is provided partway between ends of the ramp surface and spaces the ramp surface away from a loading surface of the second vehicle, so that as the first vehicle passes the fulcrum, the ramp surface tilts towards the loading surface of the second vehicle.

11 Claims, 3 Drawing Sheets

TILTABLE LOADING RAMP

The present invention relates to a tiltable loading ramp, particularly but not exclusively for loading and unloading a mobility scooter onto and from a transport vehicle.

BACKGROUND OF THE INVENTION

Mobility scooters are now popular means of transport for the elderly or infirm. They are heavy battery powered vehicles with a low centre of gravity, and typically utilise three or four wheels. Due to the weight of these scooters, transport to different locations is problematic. It is impossible for an elderly or infirm user to lift such a scooter into their car without significant assistance. As such, personal transport of such a scooter is typically not undertaken.

Furthermore, delivery of a new scooter often occurs by van or truck, and typically these vehicles do not have motorised or mechanically driven ramps to aid loading and unloading of the heavy scooter. As a consequence, injuries to the delivery person or persons can often occur whilst manually lifting the scooter.

It is therefore an object of the present invention to provide a solution to this problem which can be utilised in both domestic and commercial environments in order to safely and efficiently load and unload a first smaller vehicle from a second larger vehicle.

SUMMARY OF THE INVENTION

According to a first aspect of the present invention, there is provided a tiltable loading ramp for loading and unloading a first vehicle onto and from a second vehicle, the ramp comprising at least two ramp sections which are abuttable or substantially abuttable to form a ramp surface, and at least one support member forming a fulcrum for the ramp surface, the in use said at least one support member being provided partway between ends of the ramp surface and spacing the ramp surface away from a loading surface of the second vehicle, so that as the first vehicle passes the fulcrum, the ramp surface tilts towards the loading surface of the second vehicle.

According to a second aspect of the present invention, there is provided a loading ramp for loading and unloading a mobility scooter onto and from a transport vehicle, the ramp comprising a primary ramp section and a secondary ramp section which is shorter than the primary ramp section, the secondary ramp section having a ramp surface of reduced width relative to the said primary ramp section, so as to prevent or limit interference with stabiliser wheels of the mobility scooter during introduction onto the primary ramp section.

The present invention will now be more particularly described, by way of example only, with reference to the accompanying drawings.

DESCRIPTION OF THE PREFERRED EMBODIMENTS

Figure 1:
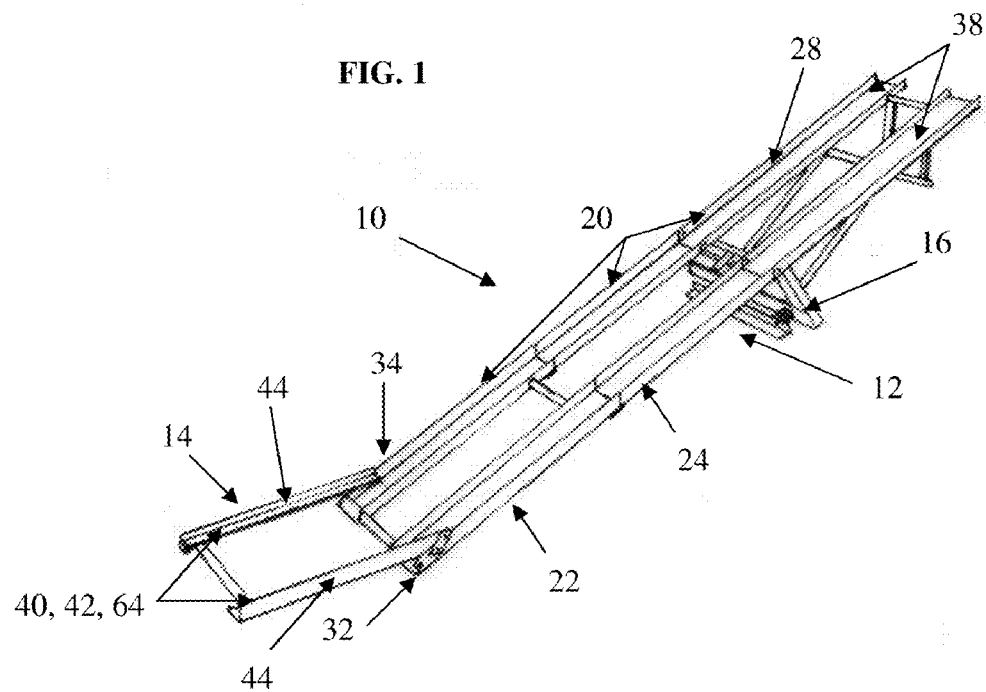
FIG. 1 shows a diagrammatic perspective view of one embodiment of a tiltable loading ramp, in accordance with the first aspect of the invention and in a fully erected and in a first titled condition.
Figure 2:
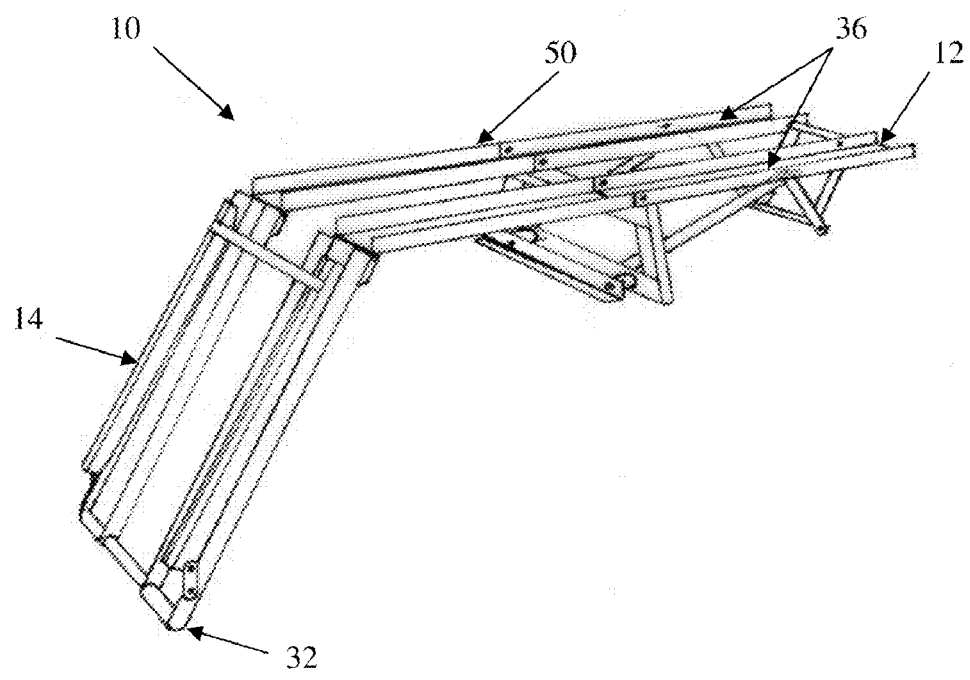
FIG. 2 shows the loading ramp in a second tilted condition.
Figure 3:
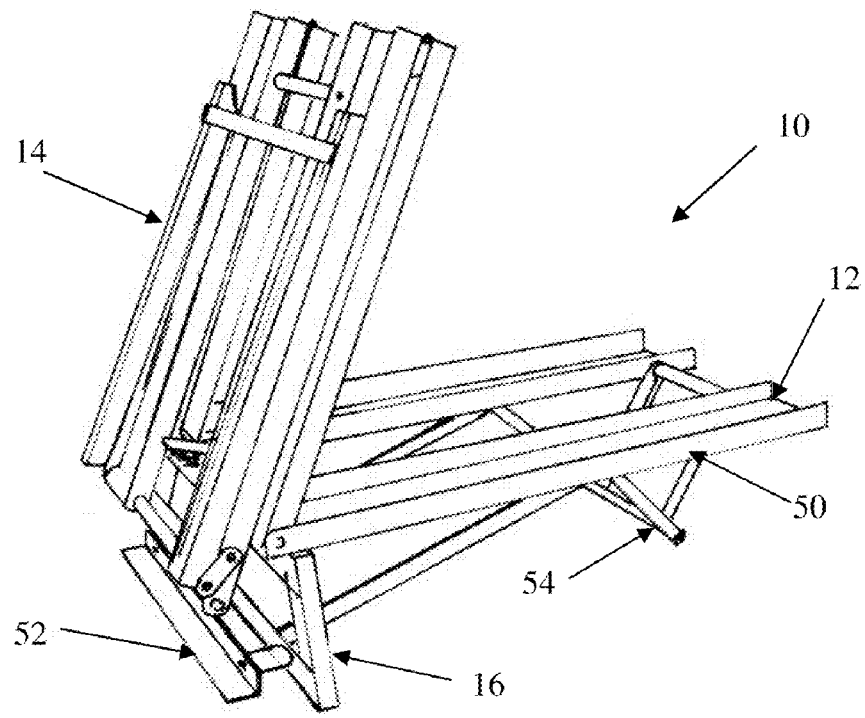
FIG. 3 shows the loading ramp in a partially folded condition.
Figure 4:
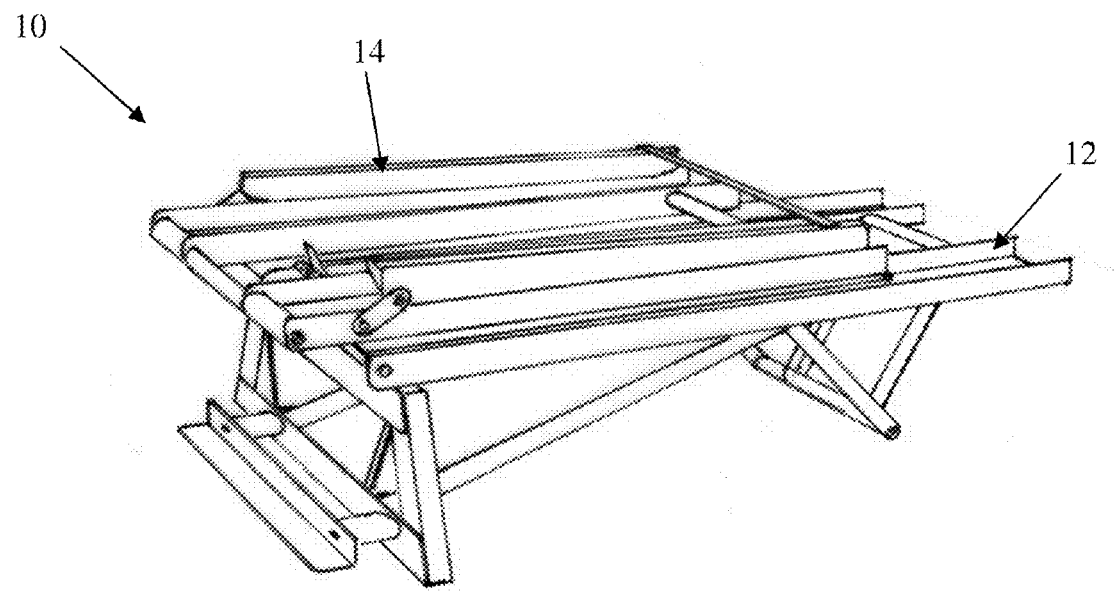
FIG. 4 shows the loading ramp in a fully folded condition.

Referring to the drawings, there is shown a tiltable loading ramp 10 which comprises a primary ramp 12, a shorter secondary ramp 14, and a support member 16 which acts as fulcrum and which spaces the primary ramp 12 from a supporting surface 18 on which the ramp 10 is placed. The ramp 10 is preferably formed from metal, such as aluminium or steel, or plastics. Ideally, the ramp 10 should be as light weight as possible, to enable ease of use, and therefore aluminium or plastics is a preferred material.

In this embodiment, the primary ramp 12 comprises three rigid ramp sections 20 which are hinged together in end-to-end fashion. Although hinging is preferred, detachable engagement, such as tongue in slot, can be used.

A proximal ramp section 22 of the ramp sections 20 of the primary ramp 12 is hinged to an intermediate ramp section 24 so as to hinge towards a rear or underside of the intermediate ramp section 24. A support wheel or wheels 26 are provided at or adjacent to the end remote from the intermediate ramp section 24. The intermediate ramp section 24 is hinged to a distal ramp section 28 of the primary ramp 12 so as to hinge towards a front or topside of the distal ramp section 28. An automatic catch or detent is included as a safety feature to releasably lock the intermediate and distal ramp sections 24, 28 in an unfolded condition to prevent accidental folding during use and tilting. The distal ramp section 28 preferably includes stops (not shown) at or adjacent to an end opposite the hinged end so as to stop a vehicle thereon from rolling off the ramp 10. With the ramp 10 erected, the adjacent ramp sections 22, 24, 28 abut or substantially abut.

The secondary ramp 14 is a single rigid section which is hinged adjacent to a leading free edge 32 of the proximal ramp section 22, so as to hinge towards a front or topside of the proximal ramp section 22. Since the secondary ramp 14 is not hinged directly at the edge of the proximal ramp section 22, the secondary ramp 14 meets a ramp surface portion 34 of the proximal ramp section 22 partway between the ends of the proximal ramp section 22.

The primary ramp 12 includes two parallel spaced tracks 36 along its longitudinal extent provided by the three ramp sections 20 and which define a ramp surface 38 for a vehicle. The secondary ramp 14 includes two parallel spaced tracks 40 defining a secondary ramp surface 42 having a reduced width relative to that of the ramp sections 20. The tracks 40 of reduced width have rails 44 thereon to entrain the wheels 46 of a first vehicle 48 for safety. The rails 44 can either be positioned to the inside or the outside of the wheels 46. The outer longitudinal edges of the secondary ramp 14 are substantially aligned with the outer longitudinal edges of the primary ramp 12. However, the inner longitudinal edges of the tracks 36 of the secondary ramp 14 are offset outwardly from those of the primary ramp 12, for reasons which will become apparent hereinafter.

The primary ramp 12 also preferably has perimeter upstanding walls 50 along its longitudinal extent, being spaced to the outside and/or inside of the wheels 46, so as to prevent the first vehicle 48 from being accidentally driven off the ramp 10 during loading or unloading.

The support member 16 is fixedly connected to an underside of the distal ramp section 28 at or adjacent to the hinged joint with the intermediate ramp section 24. The support member 16 is preferably a frame which spans between the two tracks 36, thus holding the tracks 36 in fixed spaced relationship. However, the support member can be a leg or legs which project from the underside of the ramp section. It is also feasible that the support member 16 can be provided on the intermediate ramp section 24, instead of or in addition to the distal ramp section 28.

The support member 16 includes a spacer element 52 which projects from a lower horizontal cross-member in the direction of the intermediate and proximal ramp sections 22, 24.

Preferably, a secondary support member 54, which may be in the form of a frame or leg(s), is fixed to extend from the underside of the distal ramp section 28 at or adjacent to an end opposite the hinge end.

In this embodiment, the support members 16, 54 and the spacer element 52 are fixed relative to the ramp sections 20, but the support members 16, 54 and the spacer element 52 may be adjustable to allow selective fitting of the ramp 10 to any vehicle with a bed.

Figure 5A:
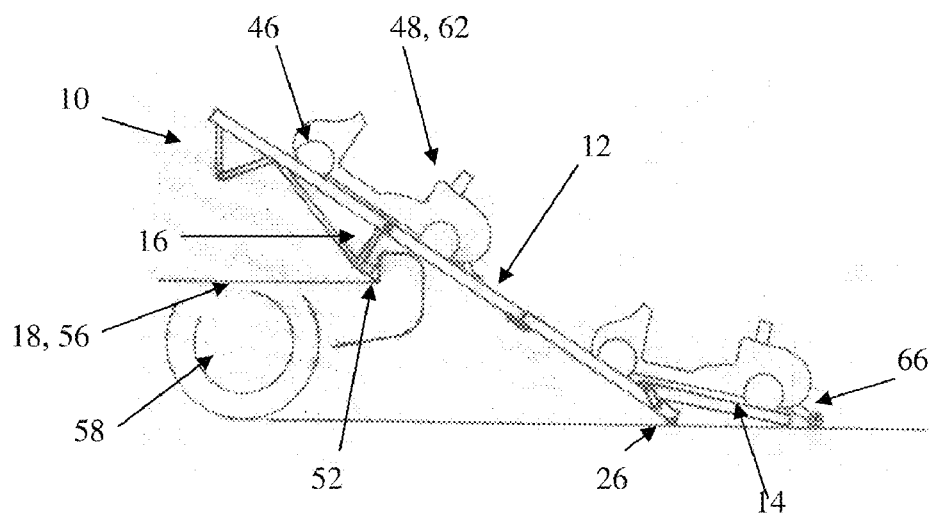
FIGS. 5a to 5c diagrammatically show the loading ramp in use.
Figure 5B:
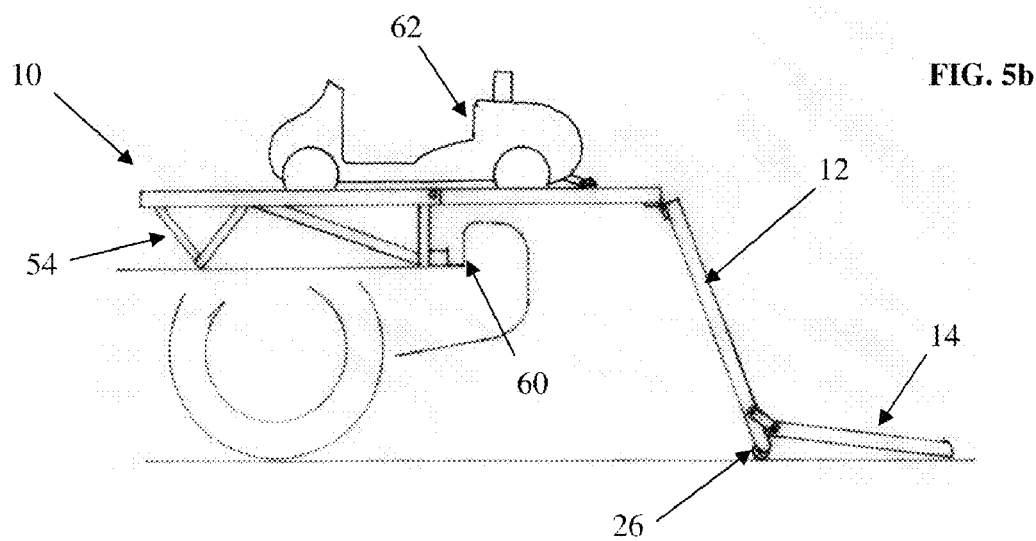
Figure 5C:
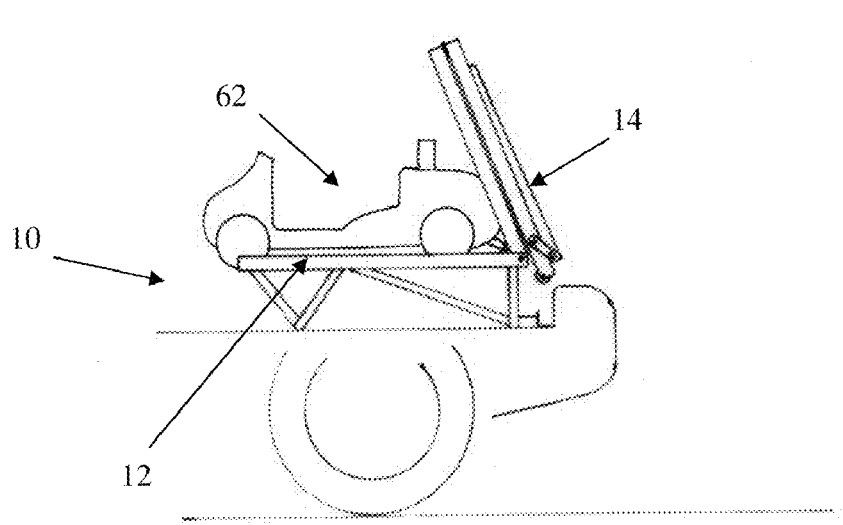

In use, and as best shown in FIGS. 5a to 5c, the loading ramp 10 is positioned on the rear bed 56 of a transport vehicle 58, typically being a truck, van or back of an estate-type or wagon-type car. The support member 16 has a height which allows tilting of the loading ramp 10 without interference by the body work, such as bumper, of the transport vehicle 58. Preferably, the support member 16 is adjustable to accommodate different vehicles, but the height of the support member 16 may be fixed, as in this embodiment.

The spacer element 52 of the support member 16 abuts a lip 60 in the bed 56 of the transport vehicle 58, adjacent to the bed opening. This prevents or limits the loading ramp 10 from slipping out of the bed 56, or moving during use.

The secondary support member 54 is at a height which preferably allows the distal ramp section 28 to reside parallel or substantially parallel with the bed 56 of the transport vehicle 58, once the ramp 10 has been tilted into the vehicle. However, the secondary support member 54 may have a slightly lower height so that the distal ramp section 28 slopes downwards towards the vehicle stops, thus preventing or inhibiting the tendency for rolling movement of a vehicle thereon.

With the loading ramp 10 in its fully erected condition, the three ramp sections 20 of the primary ramp 12 are substantially rectilinearly aligned in end-to-end fashion and tilt from the transport vehicle 58 to the adjacent ground. The secondary ramp 14 extends at a lesser pitch angle from the proximal ramp section 22 to the ground.

Mobility scooters, in particular, are extremely low to the ground and have low entry and departure clearances, hence the requirement for the secondary ramp 14. In the fully erected condition, a mobility scooter 62 can thus be driven onto the secondary ramp 14 without hindrance, before passing onto the primary ramp 12. The reduced width of the ramp surface 64 of the secondary ramp 14 prevents fouling of any stabiliser wheels 66 which are typically provided on outriggers extending behind and inboard of the rear wheels of the scooter 62. In this particular case, and without the secondary ramp 14, the stabiliser wheels 66 lift the rear drive wheels 46 as the scooter 62 is driven onto the ramp 10, thus losing drive.

Once onto the primary ramp 12, the scooter 62 is simply driven carefully and steadily to the stops at the end of the distal ramp section 28. Once the centre of mass of the scooter 62 passes the support member 16, the support member 16 and the spacer element 52 act as a fulcrum and the primary ramp 12 tilts towards the horizontal, as shown in FIG. 5b. This tilting causes the proximal ramp section 22 to hinge and be drawn in on its wheels 26. Once the primary ramp 12 is supported by both support members 16, 54 on the bed 56 of the transport vehicle 58, the scooter 62 is driven to the stops. The intermediate ramp section 24 is then folded upwards towards the rear of the scooter 62, the proximal ramp section 22 is folded to lie flat or substantially flat against the underside of the intermediate ramp section 24, and the secondary ramp 14 is folded to lie against the proximal ramp section 22. The folded sections are typically held in place by releasable straps or fasteners not shown, and the entire loading ramp 10 is releasably connected to the bed 56 of the transport vehicle 58, again typically by releasable straps or fasteners not shown.

To unload the scooter 62, the above-described process is simply repeated in reverse.

Although the tiltable loading ramp is of particular use with mobility scooters, it is of use with any smaller vehicle which requires transport via a larger vehicle having a rear bed to a new location.

Depending on the type of vehicle to be loaded, the secondary ramp can be dispensed with if the entry and departure clearances are sufficient.

To enable a shorter ramp surface length to be utilised, it is also envisaged that a vehicle to be transported could be winched up the ramp surface of the primary ramp sideways and in a direction parallel to the wheel axles. However, tilting of the ramp would still occur once the centre of mass of the vehicle passes the fulcrum defined by the support member and the spacer element.

It is feasible that the spacer element could be dispensed with, providing that the support member is substantially immovably locatable on the bed of the transport vehicle.

Although the loading ramp described above has three ramp sections, it is possible that only two ramp sections need be provided.

Furthermore, although each ramp section is preferably rectilinear or straight, one or more of the sections could be arcuate or curved. For example, by providing the proximal ramp section with a concave ramp surface at and adjacent to the leading edge may dispense with the need for the secondary ramp.

Ideally, the loading ramp is foldable for compactness. However, it may be a single ramp section which is not foldable.

It is therefore possible to provide a tiltable loading ramp for loading and unloading a first vehicle onto and from a second vehicle. It is also possible to provide a loading ramp which is compact enough to fit in the boot or back of a domestic or commercial car or vehicle. Furthermore, by providing a ramp section with a reduced track or tracks of reduced width, vehicles with stabiliser wheels can maintain drive along the entire longitudinal extent of the ramp.

The embodiments described above are provided by way of examples only, and various other modifications will be apparent to persons skilled in the art without departing from the scope of the invention as defined by the appended claims.

What is claimed is:

1. A portable tiltable loading ramp for loading and unloading a first vehicle onto and from a second vehicle, the ramp comprising:
two parallel spaced tracks provided by three ramp sections which are abuttable or substantially abuttable rectilinearly in an end-to-end fashion to form a foldable standalone ramp surface;
a first support member forming a fulcrum for the ramp surface, the said first support member being provided partway between ends of the ramp surface and spacing the entire ramp surface away from a loading surface of the second vehicle;

a spacer element operatively associated with the first support member for abutment against a lip of the second vehicle; and a secondary support member extending from an underside of a distal ramp section and positioning the distal ramp section parallel or substantially parallel to the loading surface of the second vehicle when the ramp is in a carrying position;

wherein an intermediate one of the three ramp sections is foldable upwards relative to the distal ramp section of the three ramp sections, and a proximal one of the three ramp sections is foldable downwards to lie flat or substantially flat against an underside of the intermediate ramp section;

wherein the ramp has an inclined position with at least the distal ramp section inclined with respect to the loading surface of the second vehicle for loading and unloading the first vehicle onto and from the second vehicle and a carrying position with at least the distal ramp section substantially parallel to the loading surface of the second vehicle for transporting the first vehicle with the second vehicle, wherein the secondary support member contacts the loading surface in the carrying position but does not contact the loading surface in the inclined position;

wherein as the first vehicle passes the fulcrum toward the distal ramp section, the ramp surface tilts towards the loading surface of the second vehicle into the carrying position and as the first vehicle passes the fulcrum away from the distal ramp section, the ramp surface tilts away from the loading surface of the second vehicle into the inclined position; and wherein the ramp is attachable to and usable with a plurality of second vehicles, each of the plurality of second vehicles having a different loading surface.

2. The tiltable loading ramp as claimed in claim 1, wherein the first support member is provided at or adjacent to an abuttable end of one of the ramp sections.

3. The tiltable loading ramp as claimed in claim 1, wherein the ramp sections are hinged to each other.

4. The tiltable loading ramp as claimed in claim 1, wherein the proximal ramp section includes support wheels at or adjacent to an end opposite an abuttable end.

5. The tiltable loading ramp as claimed in claim 1, wherein the secondary support member is at or adjacent to one end of the ramp surface, so that in the carrying position, the distal ramp section is supported by both the first and second support members.

6. The tiltable loading ramp as claimed in claim 1, further comprising a secondary ramp section having a ramp surface of reduced width relative to width of the three ramp sections, so as to prevent or limit interference with stabilizer wheels of the first vehicle during introduction onto the ramp.

7. The tiltable loading ramp as claimed in claim 6, wherein the first vehicle is a mobility scooter and the second vehicle is a transport vehicle for carrying and transporting the mobility scooter.

8. A portable tiltable loading ramp for loading and unloading a first vehicle onto and from a second vehicle, the ramp comprising:

a primary ramp section having distal, intermediate, and proximal ramp sections which are abuttable or substantially abuttable rectilinearly in an end-to-end fashion to form a foldable standalone ramp surface;

a first support member forming a fulcrum for the ramp surface, the first support member being provided partway between ends of the ramp surface and spacing the entire ramp surface away from a loading surface of the second vehicle;

a spacer element operatively associated with the first support member for abutment against a lip of the second vehicle;

a secondary support member extending from an underside of the distal ramp section and positioning the distal ramp section parallel or substantially parallel to the loading surface of the second vehicle when the ramp is in a carrying position; wherein the first support member, the spacer element, and the secondary support member are adjustable to allow the ramp to fit a plurality of types of second vehicles; and a secondary ramp section having at least one ramp section which is shorter in length relative to length of the primary ramp section and having a ramp surface of reduced width relative to width of the primary ramp section, the secondary ramp section attached adjacent to a leading free edge of the proximal ramp section such that the secondary ramp section meets a ramp surface portion of the proximal ramp section partway between ends of the proximal ramp section;

wherein the intermediate ramp section is foldable upwards relative to the distal ramp section and the proximal ramp section is foldable downwards to lie flat or substantially flat against an underside of the intermediate ramp section;

wherein the ramp has an inclined position with at least the distal ramp section inclined relative to the loading surface of the second vehicle for loading and unloading the first vehicle onto and from the second vehicle and a carrying position with at least the distal ramp section substantially parallel to the loading surface of the second vehicle for transporting the first vehicle with the second vehicle, wherein the secondary support member contacts the loading surface in the carrying position but does not contact the loading surface in the inclined position;

wherein as the first vehicle is being loaded onto the second vehicle a center of mass of the first vehicle passes the fulcrum of the first support member to tilt the ramp surface towards the loading surface of the second vehicle into the carrying position and as the first vehicle is being unloaded from the second vehicle the center of mass of the first vehicle passes the fulcrum of the support member to tilt the ramp away from the loading surface of the second vehicle into the inclined position; and wherein the ramp is separately attachable to and usable with the plurality of types of second vehicles, each of the plurality of second vehicles having a different loading surface.

9. The tiltable loading ramp as claimed in claim 8, wherein the first vehicle is a mobility scooter and the second vehicle is a transport vehicle for carrying and transporting the mobility scooter.

10. A portable tiltable loading ramp for loading and unloading a first vehicle onto and from a second vehicle, the ramp comprising:

a primary ramp section having distal, intermediate, and proximal ramp sections which are abuttable or substantially abuttable rectilinearly in an end-to-end fashion to form a foldable standalone ramp surface;

support wheels at or adjacent an end opposite an abuttable end of the proximal ramp section;

a first support member forming a fulcrum for the ramp surface, the first support member being provided partway between ends of the ramp surface and spacing the entire ramp surface away from a loading surface of the second vehicle;

a spacer element operatively associated with the first support member for abutment against a lip of the second vehicle;

a secondary support member extending from an underside of the distal ramp section and positioning the distal ramp section parallel or substantially parallel to the loading surface of the second vehicle when the ramp is in a carrying position; wherein the first support member, the spacer element, and the secondary support member are adjustable to allow the ramp to fit a plurality of types of second vehicles; and a secondary ramp section having at least one ramp section which is shorter in length relative to length of the primary ramp section and having a ramp surface of reduced width relative to width of the primary ramp section, the secondary ramp section attached adjacent to a leading free edge of the proximal ramp section such that the secondary ramp section meets a ramp surface portion of the proximal ramp section partway between ends of the proximal ramp section;

wherein the intermediate ramp section is foldable upwards relative to the distal ramp section and the proximal ramp section is foldable downwards to lie flat or substantially flat against an underside of the intermediate ramp section;

wherein the ramp has an inclined position with at least the distal ramp section inclined relative to the loading surface of the second vehicle for loading and unloading the first vehicle onto and from the second vehicle and a carrying position with at least the distal ramp section substantially parallel to the loading surface of the second vehicle for transporting the first vehicle with the second vehicle, wherein the secondary support member contacts the loading surface in the carrying position but does not contact the loading surface in the inclined position;

wherein as the first vehicle is being loaded onto the second vehicle a center of mass of the first vehicle passes the fulcrum of the first support member to tilt the ramp surface towards the loading surface of the second vehicle into the carrying position and as the first vehicle is being unloaded from the second vehicle the center of mass of the first vehicle passes the fulcrum of the support member to tilt the ramp away from the loading surface of the second vehicle into the inclined position; and wherein the ramp is separately attachable to and usable with the plurality of types of second vehicles, each of the plurality of second vehicles having a different loading surface.

11. The tiltable loading ramp as claimed in claim 10, wherein the first vehicle is a mobility scooter and the second vehicle is a transport vehicle for carrying and transporting the mobility scooter.

* * * * *